(No Model.)
J. J. DAVIS.
Car Wheel.
No. 237,370. Patented Feb. 8, 1881.
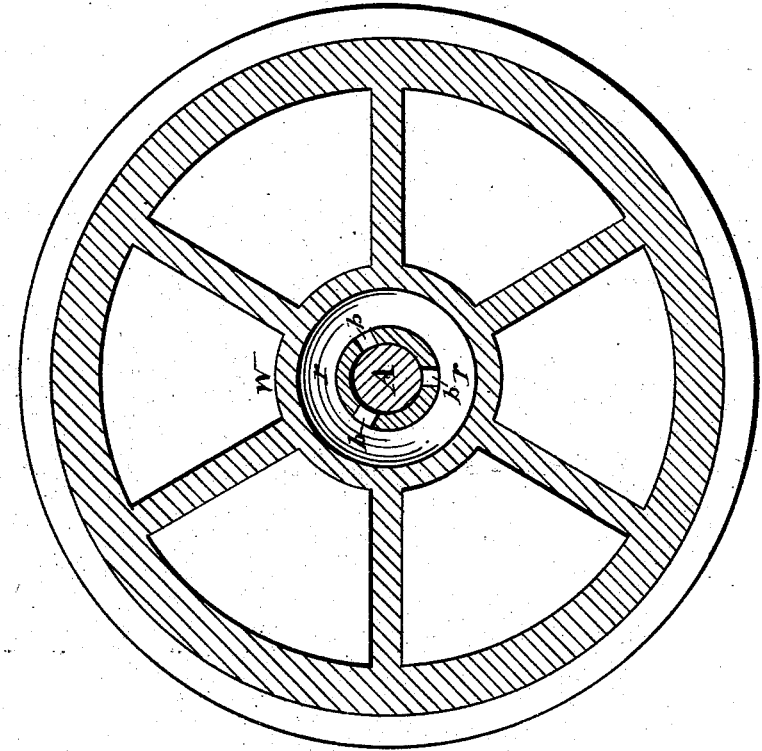
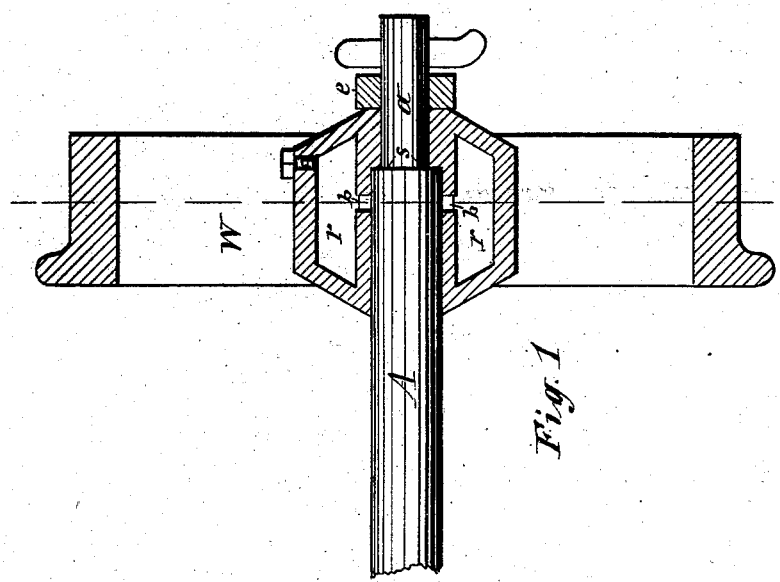
WITNESSES: INVENTOR:
C. Bendixen. John J. Davis
E. Laass. per Duell, Laass & Hey
his Atty.

UNITED STATES PATENT OFFICE.

JOHN J. DAVIS, OF ARNOT, PENNSYLVANIA.

CAR-WHEEL.

SPECIFICATION forming part of Letters Patent No. 237,370, dated February 8, 1881.

Application filed July 24, 1880. (No model.)

*To all whom it may concern:*

Be it known that I, JOHN J. DAVIS, of Arnot, in the county of Tioga, in the State of Pennsylvania, have invented new and useful Improvements in Car Axles and Wheels, of which the following, taken in connection with the accompanying drawings, is a full, clear, and exact description.

This invention relates to improvements in that class of axles and wheels in which the latter are mounted loose on the former and formed with a reservoir for the lubricant in the interior of the hub.

My improvements consist in a peculiar construction and combination of an axle having a protruding circumferentially-reduced end section, with an abrupt shoulder or offset at its junction with the main part of the axle, and a wheel cast with a hub having bearings on both the main portion and reduced portion of the axle and against the intermediate shoulder of same, and formed with an internal lubricant-reservoir completely surrounding the axle, and with radial lubricating-channels communicating directly with the main portion of the axle, and a guard-iron and linchpin, or its equivalent, on the outer protruding end of the axle, by which improvement a very simple, cheap, strong, and durable journal is obtained, which effectually resists all inward thrust of the wheel, distributes the lubricant over the axial bearings in proportion to their diameters, shows lack of lubricant first at the front or outer end of the axle, readily collects the lubricant when the wheel is at rest, and effectually prevents waste of lubricant, all as hereinafter more fully described.

In the accompanying drawings, Figure 1 is a longitudinal section of my invention, and Fig. 2 a transverse section of same.

Similar letters of reference indicate corresponding parts.

A denotes the axle, the end portion, a, of which is reduced circumferentially, as shown in Fig. 1 of the drawings. Said reduced portion is of sufficient length to form part of the bearing for the hub of the wheel, and has at its junction with the main portion of the axle an abrupt shoulder, s, which serves to resist the inward thrust of the wheel, as hereinafter demonstrated, and obviates the application of the extra collar usually employed for that purpose.

W represents the wheel, the hub of which has its axial bearing formed of two bores of different diameters, corresponding with those of the reduced end portion, a, of the axle and the adjacent main portion thereof, the smaller bore extending from the outer face of the hub inward, and intersecting, a short distance forward of the center of the wheel, the larger bore, which extends through the rear part of the hub. The said two bores form at their intersection an abrupt shoulder, which abuts against the shoulder s on the axle and serves to restrain the inward movement of the wheel. A linchpin or other suitable keeper applied to the end of the axle, with a collar or guard-iron, e, interposed between said keeper and outer face of the hub, retains the wheel on the axle. The hub of the wheel is cast hollow, or with an internal annular cavity, r, which, by radial channels b, communicates directly with the main axial bearings back of the shoulder s. Said cavity serves as a reservoir for the lubricant, which is introduced through an opening provided with a suitable stopper. The rotation of the wheel carries the lubricant around in the reservoir r, and causes it to escape, through the channels b, first to the large main portion of the axle, and thus thoroughly lubricates the portion most subjected to friction. The offset s, forming a vertical passage for the lubricant, induces the same to flow toward it. There being but one offset, and that located in the forward part of the journal, the lubricant is prevented from escaping and wasting at either end of the hub.

I do not claim, broadly, the annular lubricant-reservoir in the hub of the wheel, as I am aware the same is not new. Neither do I claim the combination, with said hub, of shoulders or offsets formed on the axle by a collar applied thereto inside the bearing of the hub, inasmuch as the offset at the rear end of said collar tends to draw the lubricant in that direction and causes it to waste through the rear end of the hub. It is the combination, with the described hub, of the offset or shoulder s, formed by the circumferentially-reduced outer end of the axle, by which the lubricant is chiefly conducted back to the bottom of the axle and to the lower portion of the reservoir $r$, and thus prevented from wasting through either end of the hub. The small protruding end of the axle, which is the least subjected to friction, receives the least lubricant, and any lack of lubricant that may occur is first shown at the outer end and most conspicuous part of the axle, thereby guarding against neglect of replenishing the lubricant-reservoir $r$.

Having thus described my improvements, what I claim as new, and desire to secure by Letters Patent, is—

The wheel W, cast with the annular reservoir $r$, radial channels $b$, and two axial bearings of different diameters, intersecting each other, with an abrupt shoulder or offset, as shown, in combination with the axle formed with the offset $s$ and the reduced end portion, $a$, which latter protrudes at the outer side of the wheel, and is provided thereat with the guard-iron $e$ and a keeper, substantially in the manner described and shown, for the purpose specified.

In testimony whereof I have signed my name and affixed the seal, in the presence of two attesting witnesses, at Arnot, in the county of Tioga and State of Pennsylvania, this 1st day of July, 1880.

JNO. J. DAVIS. [L. S.]

Witnesses:
  CHAS. H. HAHN,
  JOHN W. EVANS.